United States Patent
Takikawa (10) Patent No.: US 11,043,053 B2
(45) Date of Patent: Jun. 22, 2021

(54) VEHICLE MANAGEMENT SERVER, VEHICLE MANAGEMENT SYSTEM AND VEHICLE MANAGEMENT METHOD

(71) Applicant: Honda Motor Co., Ltd., Tokyo (JP)

(72) Inventor: Keiichi Takikawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/792,690

(22) Filed: Feb. 17, 2020

(65) Prior Publication Data

US 2020/0273272 A1 Aug. 27, 2020

(30) Foreign Application Priority Data

Feb. 25, 2019 (JP) .............................. JP2019-031301

(51) Int. Cl.
| | |
|---|---|
| *G06Q 10/08* | (2012.01) |
| *G07C 9/00* | (2020.01) |
| *G07C 5/00* | (2006.01) |
| *G06Q 50/30* | (2012.01) |
| *G06Q 10/02* | (2012.01) |
| *G06Q 30/06* | (2012.01) |

(52) U.S. Cl.
CPC ......... *G07C 9/00896* (2013.01); *G06Q 10/02* (2013.01); *G06Q 30/0645* (2013.01); *G06Q 50/30* (2013.01); *G07C 5/008* (2013.01); *G07C 9/00309* (2013.01); *G07C 9/00571* (2013.01); *G07C 2009/0092* (2013.01); *G07C 2009/00436* (2013.01); *G07C 2009/00523* (2013.01)

(58) Field of Classification Search
CPC ............ G07C 9/00896; G07C 9/00309; G07C 9/00571; G07C 5/008; G07C 2009/00436; G07C 2009/0092; G07C 2009/00523; G07C 9/00912; G07C 9/00182; G06Q 50/30; G06Q 10/02; G06Q 30/0645

See application file for complete search history.

(56) References Cited

U.S. PATENT DOCUMENTS

2003/0162536 A1 * 8/2003 Panico ..................... G08G 1/14
 455/456.3
2015/0242811 A1 * 8/2015 Gillen ..................... G06Q 50/01
 705/338

(Continued)

FOREIGN PATENT DOCUMENTS

JP 2006206225 A 8/2006

*Primary Examiner* — Munear T Akki
(74) *Attorney, Agent, or Firm* — Duft & Bornsen, PC (57) ABSTRACT

A vehicle management server for managing a shared vehicle used by a plurality of users in different time slots. The vehicle management server includes a processor and a memory connected to the processor. The processor is configured to perform: receiving use reservations for using the shared vehicle from the plurality of users; and making a use schedule of the shared vehicle. The memory is configured to perform: storing a correspondence between a plurality of containers provided in the shared vehicle and the plurality of users respectively using the plurality of containers. The processor is further configured to perform: outputting a control signal to command the shared vehicle to lock or unlock each of the plurality of containers provided in the shared vehicle based on the use schedule made in the making and the correspondence stored in the memory.

7 Claims, 4 Drawing Sheets

(56) References Cited

U.S. PATENT DOCUMENTS

| | | | |
|---|---|---|---|
| 2016/0189098 A1* | 6/2016 | Beaurepaire | H04W 12/084 |
| | | | 705/337 |
| 2017/0146354 A1* | 5/2017 | Boss | G07C 5/0866 |
| 2017/0206472 A1* | 7/2017 | Kihara | G06Q 10/02 |
| 2018/0315311 A1* | 11/2018 | Chowanic | G01C 21/34 |
| 2019/0197468 A1* | 6/2019 | Endo | H04W 4/40 |

* cited by examiner

VEHICLE MANAGEMENT SERVER, VEHICLE MANAGEMENT SYSTEM AND VEHICLE MANAGEMENT METHOD

CROSS-REFERENCE TO RELATED APPLICATION

This application is based upon and claims the benefit of priority from Japanese Patent Application No. 2019-031301 filed on Feb. 25, 2019, the content of which is incorporated herein by reference.

BACKGROUND OF THE INVENTION

Field of the Invention

This invention relates to a vehicle management server, a vehicle management system and a vehicle management method for managing a shared vehicle used by a plurality of users.

Description of the Related Art

As this type of technology, there have been known systems where a parcel destined for a user is delivered using the trunk of a previously registered user vehicle (for example, see Japanese Unexamined Patent Application Publication No. 2006-206225 (JP2006-206225A)). The system of JP2006-206225A determines the location and time slot of delivery of a parcel on the basis of previously registered user information and, when the vehicle-mounted devices of a user vehicle and a delivery vehicle authenticate each other by communication during delivery, unlocks the trunk of the user vehicle so that the parcel is put into the trunk.

In recent years, there have been widely used services, such as car-sharing services and ride-sharing services, that allow users other than the owner of a vehicle to use the vehicle as a shared vehicle. In the case of a user vehicle, the user himself or herself is able to freely manage the space in the vehicle not only in the time slot in which the user is riding on the vehicle but also in the other time slots. Similarly, in the case of a shared vehicle, if there are ensured spaces that users of the shared vehicle (users who will use the vehicle) are able to manage not only in the time slots in which the users are riding on the shared vehicle but also in other time slots, user convenience may be increased.

SUMMARY OF THE INVENTION

An aspect of the present invention is a vehicle management server for managing a shared vehicle used by a plurality of users in different time slots. The vehicle management server includes a processor and a memory connected to the processor. The processor is configured to perform: receiving use reservations for using the shared vehicle from the plurality of users; and making a use schedule of the shared vehicle. The memory is configured to perform: storing a correspondence between a plurality of containers provided in the shared vehicle and the plurality of users respectively using the plurality of containers. The processor is further configured to perform: outputting a control signal to command the shared vehicle to lock or unlock each of the plurality of containers provided in the shared vehicle based on the use schedule made in the making and the correspondence stored in the memory.

Another aspect of the present invention is a vehicle management system, including: the vehicle management server; and a vehicle used by a plurality of users in different time slots in a predetermined time period. The vehicle includes: a plurality of containers respectively configured to accommodate an item; an actuator configured to lock and unlock each of the plurality of containers; and a controller configured to control operation of the actuator. The controller is configured to control operation of the actuator in accordance with a control signal output from the vehicle management server.

Another aspect of the present invention is a vehicle management method for managing a shared vehicle used by a plurality of users in different time slots. The vehicle management method includes: receiving use reservations for using the shared vehicle from the plurality of users; making a use schedule of the shared vehicle, and outputting a control signal to command the shared vehicle to lock or unlock each of the plurality of containers provided in the shared vehicle based on the use schedule made in the making and a correspondence between a plurality of containers provided in the shared vehicle and the plurality of users respectively using the plurality of containers stored in a memory.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 4. A vehicle management server according to the embodiment of the present invention allows, for example, a provider of car-sharing services, ride-sharing services, or the like to provide, to multiple users of a shared vehicle, services that allow the users to use spaces in the shared vehicle even in time slots other than the time slots in which they are riding on the vehicle, thereby allowing the provider to promote use of the shared vehicle.

The vehicle management server according to the embodiment of the present invention can be applied to both of car-sharing services or ride-sharing services, which allow users to rent vehicles using previously registered IC cards or the like without human intervention, and car-rental services, which allow users to rent vehicles by interacting with staffs. An example in which this vehicle management server is applied to car-sharing services will be described below.

Figure 1:
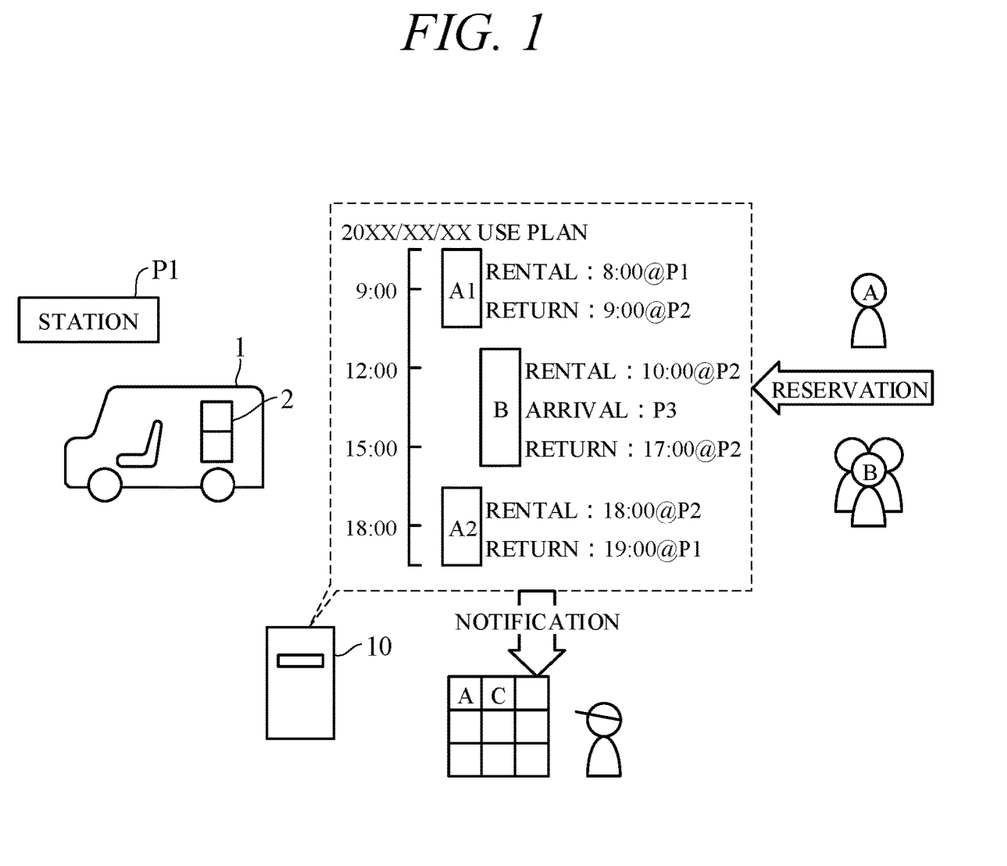
FIG. 1 is a diagram showing an example of a use scheduling operation performed by a vehicle management server according to an embodiment of the present invention.
Figure 2:
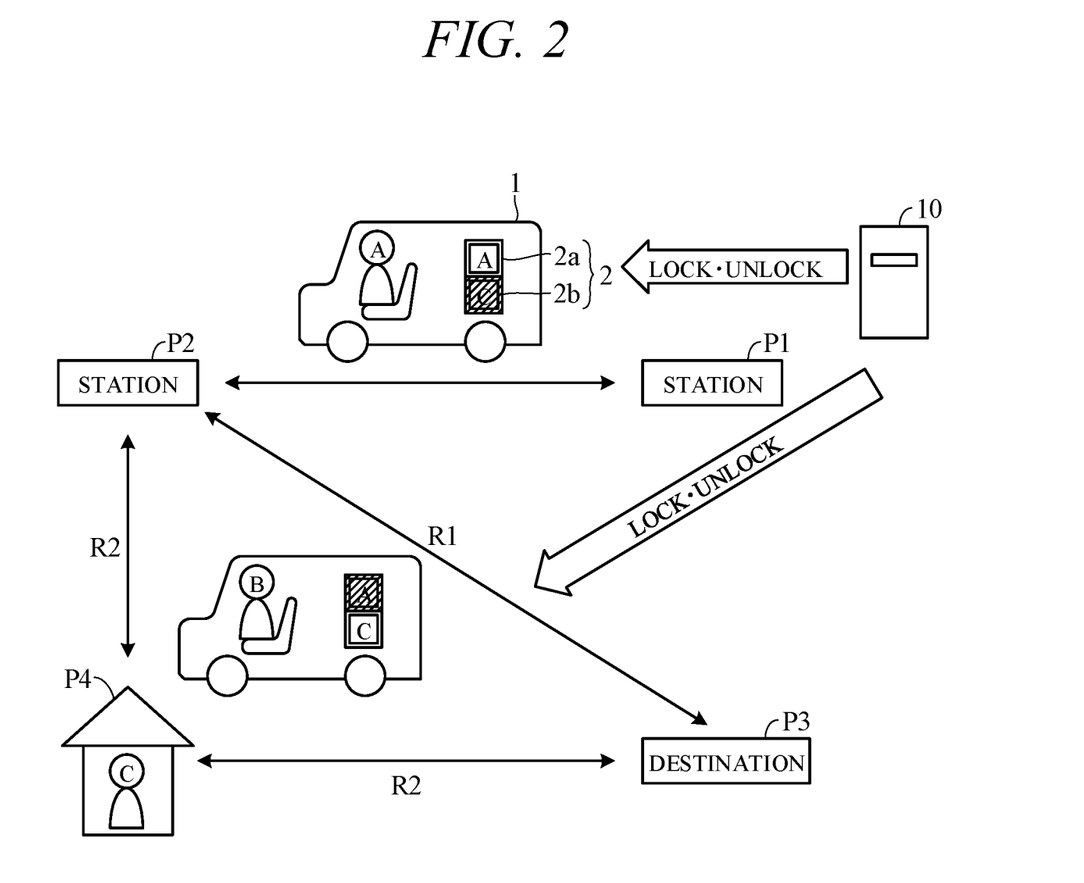
FIG. 2 is a diagram showing an example of a locking/unlocking operation performed by the vehicle management server according to the embodiment of the present invention.

FIG. 1 is a diagram showing an example of a use scheduling operation performed by a vehicle management server 10 according to the embodiment of the present invention. FIG. 2 is a diagram showing an example of a locking/unlocking operation. Vehicles 1 used for car-sharing services include various types of vehicles having different body sizes, trunk capacities, and the like, such as sedans (saloons), SUVs, minivans, and trucks. One of the vehicles 1 is parked at a predetermined parking lot (station) P1 or P2 before a user A or B uses it, and the user A or B parks the vehicle 1 at the station P1 or P2 after using it. That is, the users A and B use the vehicle 1 using the station P1 or P2 as the departure location or return location.

As shown in FIGS. 1 and 2, the vehicle 1 is provided with multiple containers 2a and 2b that include lock mechanisms and can be individually locked and unlocked. FIGS. 1 and 2 show an example in which the two box containers 2a and 2b are provided in the rear cargo space of the vehicle. However, the containers 2 may be provided in a trunk or glovebox or the like, or containers 2 having different sizes or shapes may be combined, or three or more containers 2 may be provided. Also, it is possible to make multiple containers 2 by partitioning a space in the vehicle using a partition or the like and to lock and unlock the containers 2 using lock mechanisms, such as passenger seat doors or trunk lids of the vehicle 1.

FIG. 1 shows an example in which reservations are received from the multiple users and A and B, who want to use the vehicle 1 and the use schedule of the vehicle 1 in a predetermined time period (one day in the case of FIG. 1) is determined. Note that the users A or B, who use the vehicle 1 in the same time period, may be individuals or groups. In the example of FIG. 1, reservations are received from the user A, who wants one-way use from the station P1 to the station P2 in a time slot A1 and one-way use from the station P2 to the station P1 in a time slot A2, and the user B, who wants round-trip use from the station P2 to a destination P3 in a time slot B, and the use schedule of the vehicle 1 is made.

The use schedule of the vehicle 1 thus made is reported to a delivery service provider that has a delivery center near the station P1. Thus, if the delivery service provider is scheduled to deliver a parcel to the user A or B on the same day, it is able to make, to the user A or B, a suggestion that the vehicle 1 (a container 2) be used as the parcel delivery location. Also, if the delivery or collection destination of a parcel to be delivered or collected on the same day is present near the route through which the vehicle 1 used by the user A or B is scheduled to pass, the delivery service provider is able to make, to the user A or B, a suggestion that the user A or B undertake a part of the delivery or collection work of the delivery service provider.

In the example of FIG. 1, parcels to be delivered on the same day are a parcel A destined for the user A, who will use the vehicle 1, and a parcel C destined for a user C, who will not use the vehicle 1. In this case, as shown in FIG. 2, the delivery service provider makes, to the user A, a suggestion that the vehicle 1 be used as the parcel delivery location, as well as makes, to the user B, who will use the vehicle 1 near the home of the user C (destination P4), a suggestion that the user B undertake the delivery work of the parcel C destined for the user C. If the users A and B accept these suggestions, the delivery service provider is able to load the parcel A destined for the user A, and the parcel C destined for the user C whose delivery the delivery service provider has requested for the user B, on the vehicle 1 at one time at the station P1 before the vehicle 1 leaves.

The vehicle management server 10 remotely manages or controls locking and unlocking of the containers 2a and 2b of the vehicle 1. Specifically, the vehicle management server 10 regards the time slot before the user A or B starts to use the vehicle 1 as the time slot in which the delivery service provider loads the parcels, and unlocks the container 2a or 2b along with the vehicle 1 (a trunk lid, etc.) in the time slot before the user A or B starts to use the vehicle 1.

When the delivery service provider puts the parcel A destined for the user A, and the parcel C destined for the user C whose delivery the delivery service provider has requested for the user B, in the containers 2a and 2b and transmits information indicating the correspondence between the users A and B and the containers 2a and 2b to the vehicle management server 10, the vehicle management server 10 locks the containers 2a and 2b and vehicle 1. For example, a delivery terminal owned by the delivery service provider transmits information indicating the correspondence between the management numbers of the containers 2a and 2b and the user IDs of the users A and B to the vehicle management server 10. Note that the vehicle management server 10 may determine the correspondence between the users A and B and the containers 2a and 2b and transmit information indicating the correspondence to the delivery service provider.

Subsequently, the vehicle management server 10 manages or controls locking and unlocking of the containers 2a and 2b of the vehicle 1 on the basis of the correspondence.

As shown in FIG. 2, when the time slot A1, in which the user A reserves the vehicle 1, comes, the user A rides on the vehicle 1 at the station P1 and starts to use the vehicle 1. When it is confirmed that the user A has started to use the vehicle 1 using his or her previously registered authentication card, such as an IC card, the vehicle management server 10 unlocks the container 2a accommodating the parcel A destined for the user A and locks the other container 2b (keeps the container 2b locked).

The container 2a is unlocked through the time slots A1 and A2 in which the user A uses the vehicle 1. Thus, for example, in the office-going time slot A1, the user A is able to take out the parcel A from the container 2a before ending the use of the vehicle 1 and getting off the vehicle 1 at the station P2 near his or her office. Or, in the home-going time slot A2, the user A is able to take out the parcel A from the container 2a before ending the use of the vehicle 1 and getting off the vehicle 1 at the station P1 near his or her home.

The container 2a is locked in the time slot B, in which the user A does not use the vehicle 1. Thus, in the time slot between the time slot A1 and time slot A2, the user A is able to use the container 2a as a locker for accommodating his or her personal belongings or the like. That is, each user is able to use a container 2 as a space managed by himself or herself from before the car sharing service use start time, at which the user rides on the vehicle 1, until the final return time.

As shown in FIG. 2, when the time slot B, in which the user B reserves the vehicle 1, comes, the user B rides on the vehicle 1 at the station P2 and starts to use the vehicle 1. When it is confirmed that the user B has started to use the vehicle 1 using his or her authentication card, the vehicle management server 10 unlocks the container 2b accommodating the parcel C destined for the user C whose delivery the delivery service provider has requested for the user B, and locks the other container 2a (keeps the container 2a locked). The user B stops by at the delivery destination P4 (e.g., the home of the user C) on an outward way from the station P2 to the destination P3 or an inward way from the destination P3 to the station P2 and delivers the parcel C to the user C. This means that the user B undertakes a part of the delivery work of the delivery service provider. For this reason, the user B receives a reward from the delivery service provider. That is, the usage fee of the vehicle 1 is discounted by the reward.

In this case, a route R2 used to stop by at the destination P4 is longer than a direct route R1 between the station P2 and destination P3, and it takes more time to make a trip along the route R2 and direct route R1 than to make a round trip along the direct route R1. Accordingly, the user B uses the vehicle 1 longer, which may lead to an increase in the usage fee. However, for example, by discounting the vehicle usage fee by a larger amount than the increase in the usage fee, there is increased the number of users who want to use the vehicle 1 while delivering a parcel even if it takes some more time, and thus the frequency of use of the vehicle 1 is increased. Also, the number of users who use the vehicle 1 for the main purpose of delivering a parcel may be increased. Also, the delivery service provider can resolve the shortage of delivery workers by causing users to undertake delivery work.

If the user of the vehicle 1 collects a parcel from another user in place of or in addition to delivering a parcel to another user, the delivery service provider can obtain the collected parcel from the vehicle 1 at the station P1 near the delivery center after the vehicle 1 is returned. Since the containers 2a and 2b of the vehicle 1 are individually locked and unlocked, the collected parcel is not mistakenly taken out by other users. To favorably realize the above-mentioned operation, the vehicle management server according to the present embodiment is configured as follows.

Figure 3:
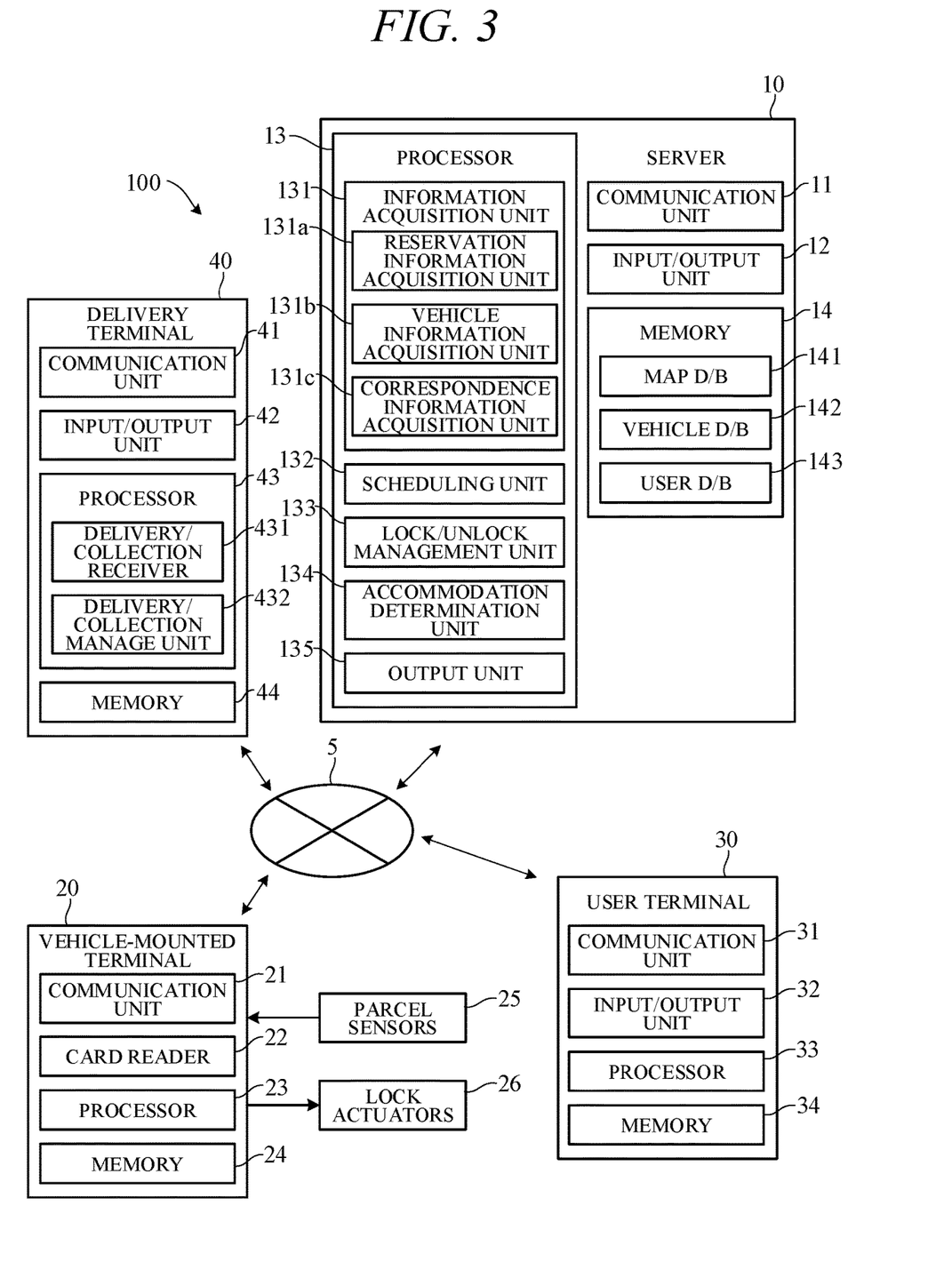
FIG. 3 is a block diagram showing the overall configuration of a vehicle management system including the vehicle management server according to the embodiment of the present invention.

FIG. 3 is a block diagram showing the overall configuration of a vehicle management system 100 including the vehicle management server 10 of the embodiment of the present invention. As shown in FIG. 3, the vehicle management system 100 includes the vehicle management server 10 owned by a car sharing service provider, a vehicle-mounted terminal 20 disposed on a vehicle 1 owned by the car sharing service provider, a user terminal 30 owned by a user of the vehicle 1, and a delivery terminal 40 owned by a delivery service provider that provides parcel delivery services.

The vehicle management server 10, vehicle-mounted terminal 20, user terminal 30, and delivery terminal 40 are connected to a communication network 5, such as a wireless communication network, the Internet, or a telephone line network. While FIG. 3 shows the single vehicle-mounted terminal 20, the single user terminal 30, and the single delivery terminal 40 for convenience, the vehicle management system 100 may include the respective vehicle-mounted terminals 20 of multiple vehicles 1, the respective user terminals 30 of multiple users, and the respective delivery terminals 40 of multiple delivery service providers. While the single vehicle management server 10 is shown in FIGS. 1 to 3, the functions of the vehicle management server 10 shown in FIGS. 1 to 3 may be distributed to multiple servers.

While the vehicle management server 10 is disposed in, for example, the car sharing service provider, the vehicle management server 10 may be formed using virtual server functions on cloud computing. The vehicle management server 10 includes a communication unit 11, an input/output unit 12, a processor 13, and a memory 14.

The communication unit 11 is configured to be able to wirelessly communicate with the vehicle-mounted terminal 20, user terminal 30, and delivery terminal 40 through the communication network 5. The input/output unit 12 includes, for example, a keyboard, a mouse, a monitor, a touchscreen, and the like. The processor 13 includes a CPU (processor and memory). The processor 13 performs predetermined processing on signals inputted through the input/output unit 12, signals received from outside the vehicle management server 10 through the communication unit 11, and data stored in the memory 14 and outputs control signals to the input/output unit 12 and memory 14.

The memory 14 includes a volatile memory or non-volatile memory (not shown). The memory 14 stores various types of programs executed by the processor 13 and various types of data. The memory 14 includes, as functional elements, a map database 141, a vehicle database 142, and a user database 143.

The map database 141 stores map information indicating maps including roads. The map information includes information about the present or prospective traffic congestion, road construction, road closure, and the like, information about the parking areas around the parcel delivery destinations, and other types of information, and these types of information are updated at any time.

The vehicle database 142 stores vehicle information about multiple vehicles 1 used for car sharing services, that is, vehicle information indicating the states or characteristics of the vehicles 1, such as the vehicle types, model years, body numbers, vehicle numbers, travel distances, maintenance histories, and availabilities, and the use schedules (FIG. 1) of the vehicles 1. The use schedules includes information about the past, present, and future time-series reservations of the vehicles 1.

The user database 143 stores information about the individual users A and B, such as the user IDs, addresses, names, contact information, and driver's license numbers, inputted through the user terminals 30 (input/output units 32) and information indicating the correspondence between the users A and B and the containers 2a and 2b inputted through the delivery terminal 40 (input/output unit 42). That is, the user database 143 stores user information that includes personal information registered for each of the users A and B and information indicating the management numbers of the containers 2a and 2b used by the users A and B in a predetermined time period such that these types of information are associated with the user IDs.

The processor 13 includes an information acquisition unit 131, a scheduling unit 132, a lock/unlock management unit 133, an accommodation determination unit 134, and an output unit 135 as functional elements, particularly, as elements related to locking and unlocking of the containers 2 during use of a car sharing service.

The information acquisition unit 131 is configured to acquire various types of information through the communication network 5 and includes a reservation information acquisition unit 131a, a vehicle information acquisition unit 131b, and a correspondence information acquisition unit 131c as functional elements.

The reservation information acquisition unit 131a acquires reservation information indicating the reservations of the vehicle 1 inputted by the users A and B through the input/output units 32 of the user terminals 30. The reservation information includes information indicating the types and the scheduled use start dates/times and scheduled return dates/times of the vehicles 1, as well as information about the destinations when using the vehicles, that is, information indicating the destination addresses, the scheduled destination arrival dates/times, and the like. The vehicle information acquisition unit 131b acquires vehicle information stored in the vehicle database 142. Also, when a process of renting the vehicle to the user A or B is complete, the vehicle information acquisition unit 131b acquires vehicle information from the vehicle-mounted terminal 20 along with the corresponding vehicle ID. The correspondence information acquisition unit 131c acquires information indicating the correspondence between the users A and B and the containers 2a and 2b stored in the user database 143.

The scheduling unit 132 makes the use schedules (FIG. 1) of the vehicles 1 in a predetermined time period (e.g., one day) on the basis of the reservation information of the vehicles 1 acquired by the reservation information acquisition unit 131a and the vehicle information acquired by the vehicle information acquisition unit 131b. The use schedules of the vehicles 1 made by the scheduling unit 132 are transmitted to the delivery terminal 40 by the output unit 135.

The lock/unlock management unit 133 manages or controls locking and unlocking of the containers 2a and 2b of each vehicle 1 on the basis of the authentication card reading result acquired by the vehicle information acquisition unit 131b and the correspondence between the users A and B and the containers 2a and 2b acquired by the correspondence information acquisition unit 131c. Specifically, the lock/unlock management unit 133 determines whether the user A or B has started or ended use of the vehicle 1, on the basis of the authentication card reading result and identifies the container 2a or 2b corresponding to the user A or B who is using the vehicle 1, on the basis of the correspondence between the users A and B and containers 2a and 2b.

The lock/unlock management unit 133 then generates an unlock signal to unlock the container 2a or 2b corresponding to the user A or B who is using the vehicle 1, as well as generates a lock signal to lock the container 2b or 2a other than the container 2a or 2b corresponding to the user A or B. The lock signal and unlock signal generated by the lock/unlock management unit 133 are transmitted to the vehicle-mounted terminal 20 by the output unit 135.

The accommodation determination unit 134 determines whether any item is accommodated in the container 2a or 2b corresponding to the user A or B who is using the vehicle 1, on the basis of a signal from a parcel sensor acquired by the vehicle information acquisition unit 131b and the correspondence between the users A and B and containers 2a and 2b acquired by the correspondence information acquisition unit 131c.

When it detects that a parcel whose delivery has been requested from the user A or B who is using the vehicle 1 has been taken out from the container 2a or 2b, the accommodation determination unit 134 determines that the delivery of the parcel is complete. Or, when it detects that a parcel whose collection has been requested from the user A or B who is using the vehicle 1 is accommodated in the container 2a or 2b, the accommodation determination unit 134 determines that the collection of the parcel is complete. When the accommodation determination unit 134 determines that the collection or delivery of the parcel is complete, an incentive (discount fee) is confirmed to be given to the user, and a notification indicating the completion of the delivery or collection is transmitted to the delivery terminal 40 by the output unit 135.

If it detects that an item, such as a parcel or personal belonging, is left in the container 2a or 2b corresponding to the user A or B when the user A or B ends the use of the vehicle 1, the accommodation determination unit 134 determines that there is something forgotten. The accommodation determination unit 134 then outputs a notification signal to the vehicle 1 (vehicle-mounted terminal 20) or user terminal 30 so that the user is notified of the presence of the forgotten thing by means of a speech, display of a message, lighting-up of a lamp, vibration of a vibrator, or the like.

The vehicle-mounted terminal 20 includes a communication unit 21, a card reader 22, a processor 23, and a memory 24. Parcel sensors 25 and lock actuators 26 are connected to the vehicle-mounted terminal 20.

The parcel sensors 25 consist of weight sensors, infrared sensors, cameras, or the like disposed in the containers 2a and 2b and detect whether any item, such as a parcel, is present or accommodated in the container 2a or 2b.

The lock actuators 26 lock or unlock the containers 2a and 2b by driving the lock mechanisms of the containers 2a and 2b in the vehicle 1 in accordance with a command from the vehicle management server 10 (the processor 13). Specifically, the lock actuators 26 unlock the lock mechanisms when an unlock signal is outputted from the vehicle management server 10; they lock the lock mechanisms when a lock signal is outputted from the vehicle management server 10.

The communication unit 21 is configured to be able to wirelessly communicate with the vehicle management server 10 through the communication network 5. The communication unit 21 transmits signals from the parcel sensors 25 to the vehicle management server 10 along with a vehicle ID identifying the vehicle 1 every predetermined time.

The card reader 22 reads user information from the authentication cards owned by the users A and B. The authentication cards are, for example, driver's licenses that incorporate an integrated circuit (IC) and store personal information of the user A or B. The card reader 22 is disposed in a predetermined position (e.g., below the rear window) of the vehicle 1 so that it can recognize the authentication card brought close thereto from outside the vehicle.

The processor 23 includes a CPU. The processor 23 performs predetermined processing on signals inputted through the card reader 22, signals detected by the parcel sensors 25, signals received from outside the vehicle-mounted terminal 20 through the communication unit 21, and data stored in the memory 24 and outputs control signals to the lock actuators 26 of the containers 2a and 2b and the memory 14.

The processor 23 also outputs control signals to the communication unit 21 to control transmission and reception of signals between the vehicle-mounted terminal 20 and vehicle management server 10. For example, when the user A or B brings his or her authentication card close to the card reader 22 when starting (renting) or ending (returning) the use of the vehicle 1, the processor 23 transmits user information read by the card reader 22 to the vehicle management server 10 through the communication unit 21.

The vehicle management server 10 confirms (authenticates) reservation information corresponding to the received user information and transmits commands to lock and unlock the containers 2a and 2b, to the processor 23 on the basis of the correspondence between the users A and B and the containers 2a and 2b stored in the memory 14 (the user database 143). The processor 23 outputs a lock signal and an unlock signal to the lock actuators 26 on the basis of the received lock command and unlock command.

The memory 24 includes a volatile memory or non-volatile memory (not shown). The memory 24 stores various types of programs executed by the processor 23 and various types of data. For example, the memory 24 temporarily stores data detected by the parcel sensors 25. The stored detection data is processed by the processor 23 and transmitted to the vehicle management server 10 through the communication unit 21 every predetermined time.

The user terminal 30 consists of a personal computer, a mobile wireless terminal, such as a smartphone, or the like operated by the user. The user terminal 30 includes a communication unit 31, an input/output unit 32, a processor 33, and a memory 34.

The communication unit 31 is configured to be able to wirelessly communicate with the vehicle management server 10 and delivery terminal 40 through the communication network 5. The communication unit 31 transmits a signal to make reservation, cancellation, or the like of the vehicle 1, to the vehicle management server 10 along with a user ID identifying the user. The communication unit 31 also receives, from the delivery terminal 40, information indicating a suggestion that the vehicle 1 be used as the location to which a parcel from the delivery service provider is delivered, a suggestion that the user undertake delivery or collection of a parcel during use of the vehicle, or the like.

The input/output unit 32 includes, for example, a keyboard, a mouse, a monitor, touchscreen, and the like. The user inputs user information through the input/output unit 32. The user information includes the address, name, contact information, and driver's license number of the user, information required for payment (e.g., the credit card number), and the like. The user is allowed to use the shared vehicle only after the user registers himself or herself as a member by inputting the user information.

When reserving the vehicle 1, the user specifies the vehicle type, the station to be used, and the use dates/times (use start date/time and use end date/time) of the vehicle 1. The vehicle management server 10 retrieves reservable vehicles 1 that satisfy one or all of the specified conditions, that is, the vehicle type, station, and use dates/times and transmits vehicle information indicating the retrieved vehicles 1 to the user terminal 30. The vehicle information is displayed on the input/output unit 32. When the user selects a desired vehicle 1 from the displayed vehicles 1 through the input/output unit 32 or accepts the displayed single vehicle 1 through the input/output unit 32, the vehicle reservation is confirmed.

The user may also input, through the input/output unit 32, a command to make reservation, change, cancellation or the like of the vehicle 1, destination information indicating the destination, the desired destination arrival date/time and desired destination departure date/time, and the like, and a command to give acceptance or the like to a suggestion that the vehicle 1 be used as the location to which a parcel from the delivery service provider is delivered or a suggestion that the user undertake delivery or collection of a parcel during use of the vehicle.

The processor 33 includes a CPU. The processor 33 performs predetermined processing on signals inputted through the input/output unit 32, signals received from outside the user terminal 30 through the communication unit 31, and data stored in the memory 34 and outputs control signals to the communication unit 31, input/output unit 32, and memory 34. Thus, the user is able to change or confirm the reserved vehicle through the input/output unit 32 (monitor, etc.).

The memory 34 includes a volatile memory or non-volatile memory (not shown). The memory 34 stores various types of programs executed by the processor 33 and various types of data.

The delivery terminal 40 consists of a personal computer, a mobile wireless terminal, such as a smartphone, or the like operated by the delivery service provider. The delivery terminal 40 includes a communication unit 41, an input/output unit 42, a processor 43, and a memory 44.

The communication unit 41 is configured to be able to wirelessly communicate with the vehicle management server 10 and user terminal 30 through the communication network 5. The communication unit 41 receives the use schedule of the vehicle 1 from the vehicle management server 10, transmits, to the user terminal 30, information indicating a suggestion that the vehicle 1 be used as the location to which a parcel is delivered, a suggestion that the user undertake delivery or collection of a parcel during use of the vehicle, and the like, and receives information indicating acceptance or the like to each suggestion from the user terminal 30.

The communication unit 41 also transmits information indicating the correspondence between the users A and B and the containers 2a and 2b to the vehicle management server 10, as well as receives, from the vehicle management server 10, a notification indicating completion of delivery or collection of a parcel that has been requested from the user A or B who is using the vehicle 1. The information indicating the correspondence between the users A and B and the containers 2a and 2b include information indicating the correspondence between the management numbers of the containers 2a and 2b into which the delivery service provider has put the parcels corresponding to the users A and B and the user IDs of the users A and B.

The input/output unit 42 is a so-called "human interface" (HMI) and includes a keyboard, a mouse, a monitor, a touchscreen, a printer, and the like operable by the delivery service provider. The delivery service provider is able to input suggestions made for the users A and B through the input/output unit 42 and to confirm acceptance or the like to the suggestions from the users A and B therethrough. The delivery service provider is also able to input, through the input/output unit 42, information indicating the correspondence between the user IDs of the users A and B who have accepted the suggestions and the management numbers of the containers 2a and 2b in which the parcels corresponding to the users A and B are accommodated (in the case of collection, into which such parcels are to be putted).

The processor 43 includes a CPU (a processor and a memory). The processor 43 performs predetermined processing on signals inputted through the input/output unit 42, signals received from outside the delivery terminal 40 through the communication unit 41, and data stored in the memory 44 and outputs control signals to the communication unit 41, input/output unit 42, and memory 44.

The processor 43 includes, as functional elements, a delivery/collection receiver 43 and a delivery/collection manager 432. The delivery/collection receiver 431 receives parcel delivery/collection requests from customers through phone calls, emails, faxes, or the like. At this time, the delivery/collection receiver 431 acquires parcel information about each parcel. The parcel information includes the location of delivery or collection of the parcel (e.g., the destination P4 in FIG. 2), the size, weight and item name of the parcel, the desired parcel delivery/collection date/time, and the like.

The delivery/collection manager 432 draws up the delivery/collection schedules of the parcels on the basis of the acquired parcel information, assigns the parcels to delivery workers in accordance with the delivery/collection schedules, and manages or controls the flow of the parcels until the delivery or collection of each parcel is complete. The delivery workers include the employees of the delivery service provider, who are involved in delivery work on a full-time basis, as well as temporary delivery workers, such as the users A and B of car-sharing services.

The memory 44 includes a volatile memory or non-volatile memory (not shown). The memory 44 stores parcel information associated with each parcel ID, as well as various types of programs executed by the processor 43 and various types of data.

Figure 4:
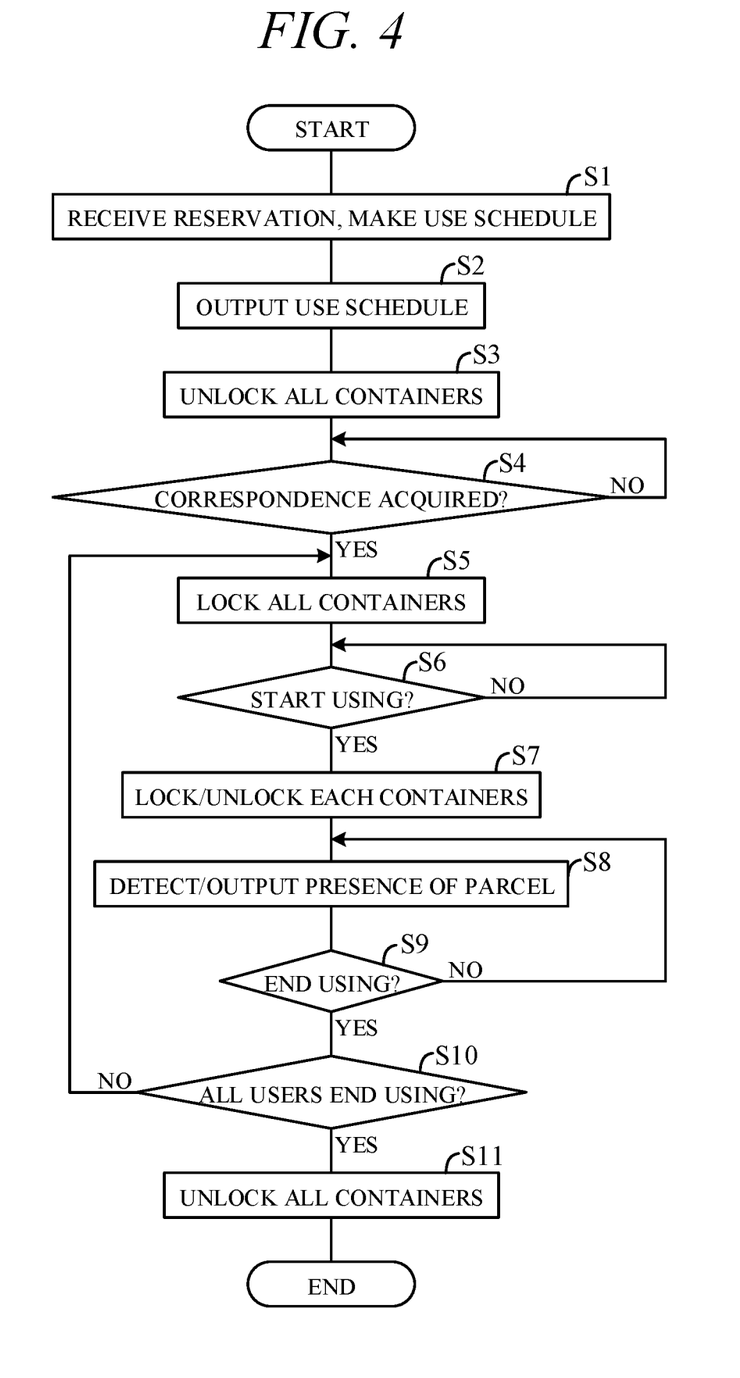
FIG. 4 is a flowchart showing an example of a process performed by a processor of the vehicle management server of FIG. 3.

FIG. 4 is a flowchart showing an example of a process performed by the processor 13 of the vehicle management server 10 in accordance with a previously stored program and, more specifically, an example of a process related to locking and unlocking of the containers 2 during use of the vehicle. The process shown in this flowchart is started, for example, when the vehicle management server 10 receives a reservation of the vehicle 1 from the user terminal 30.

First, in S1 (S means a process step), the information acquisition unit 131 reads various types of information including reservation information, and the scheduling unit 132 makes a use schedule. Then, in S2, the output unit 135 transmits the use schedule made in S1 to the delivery terminal 40. Then, in S3, the lock/unlock management unit 133 issues commands to unlock both the containers 2a and 2b. That is, the lock/unlock management unit 133 unlocks both the containers 2a and 2b so that the delivery service provider can put parcels into those containers as necessary.

Then, in S4, the information acquisition unit 131 waits until it receives information indicating the correspondence between the users A and B and the containers 2a and 2b from the delivery terminal 40 of the delivery service provider that has put the parcels into the containers 2a and 2b. Then, in S5, the lock/unlock management unit 133 issues commands to lock both the containers 2a and 2b.

Then, in S6, the information acquisition unit 131 waits until it acquires the authentication card reading result indicating that the user A or B has started to use the vehicle 1. Then, in S7, the lock/unlock management unit 133 issues a command to unlock the container 2a or 2b corresponding to the user A or B who is using the vehicle 1, as well as issues a command to lock the other container 2b or 2a.

Then, in S8, the information acquisition unit 131 acquires, from the parcel sensors 25, signals indicating whether any item is accommodated in the container 2a or 2b, and the accommodation determination unit 134 determines whether the delivery or collection of the parcels is complete and whether there is something forgotten. The output unit 135 outputs a notification indicating these determinations.

Then, in S9, the information acquisition unit 131 acquires the authentication card reading result indicating that the user A or B has ended the use of the vehicle 1. Then, in S10, the information acquisition unit 131 determines whether all the users who have made reservations in the predetermined time period have ended the use of the vehicle 1. If the determination in S10 is NO, the process returns to S5; if the determination in S10 is YES, the process proceeds to S11. In S11, the lock/unlock management unit 133 issues commands to unlock both the containers 2a and 2b. Specifically, the lock/unlock management unit 133 unlocks both the containers 2a and 2b for acquisition of the collected parcels by the delivery service provider, cleaning of the shared vehicle, or other purposes.

The operation of the present embodiment is summarized as follows. When the users A and B input information about reservations of the shared vehicle 1 through the respective user terminals 30, the reservations are received and the one-day use schedule of the vehicle 1 (the use schedule in FIG. 1) is made (S1 in FIG. 4). The delivery service provider that has been notified of the use schedule of the vehicle 1 makes, to the users A and B, a suggestion that a parcel to be delivered on the same day be delivered to the vehicle 1 or a suggestion that the user undertake delivery of such a parcel to the destination P4 (FIG. 1). If the users A and B accept the suggestions, the delivery service provider loads the parcels A and C (FIGS. 1 and 2) on the vehicle 1 that has yet to leave, at the station P1 (S2, S3).

Thus, the delivery service provider is able to load the parcels destined for the multiple users at one time at the station P1 near the delivery center. Also, the user is able to ensure a space in the shared vehicle from before the reserved time and to use the space for receipt of the parcel from the delivery service provider or other purposes.

When the delivery service provider inputs information indicating the correspondence between the management numbers of the containers 2a and 2b (FIGS. 1 and 2) accommodating the parcels A and C and the user IDs of the user A, who will receive the parcel A, and the user B, who will deliver the parcel C, through the delivery terminal 40, respective notifications are transmitted when delivery of the parcels A and C is complete (S4, S8). Thus, the delivery service provider is able to confirm that the parcels A and C loaded on the shared vehicle have been delivered to the users A and C.

While the user A uses the vehicle 1, only the container 2a accommodating the parcel A that the user A will receive is kept unlocked. While the user B uses the vehicle 1, only the container 2b accommodating the parcel C that the user B will deliver is kept unlocked. The other container is kept locked (S6, S7). This configuration is able to prevent the parcel of the user A or B or the parcel whose delivery has been requested from the user A or B from being mistakenly taken out by another user. Also, if there is anything forgotten in the container 2a or 2b when the user ends the use of the vehicle 1, a notification indicating the presence of the forgotten thing is transmitted to the corresponding user terminal 30 (S8). Thus, the forgotten thing can be addressed.

The present embodiment can achieve advantages and effects such as the following:

(1) The vehicle management server 10 according to the embodiment of the present invention manages or controls the vehicle 1 that the multiple users A and B use in the different time slots A1, A2, and B (FIG. 1). The vehicle management server 10 includes the scheduling unit 132 that receives use reservations for using the vehicle 1 made by the users A and B and makes the use schedule of the vehicle 1, the memory 14 that stores the correspondence between the multiple containers 2a and 2b disposed in the vehicle 1 and the users A and B, who use the containers 2a and 2b, and the output unit 135 that outputs control signals to lock or unlock the containers 2a and 2b, to the vehicle 1 on the basis of the use schedule made by the scheduling unit 132 and the correspondence stored in the memory 14 (FIG. 3).

This configuration allows each user to ensure a space freely manageable by himself or herself from before the reserved time even in the vehicle shared by the multiple users. If the spaces in the vehicle previously ensured by the multiple users are used as the locations to which parcels from the delivery service provider are delivered, the delivery service provider is able to load parcels destined for the multiple users at one time near the distribution center and thus to make the delivery work efficient.

(2) The output unit 135 identifies the container 2a or 2b corresponding to the user A or B who is using the vehicle 1 of the containers 2a and 2b on the basis of the correspondence stored in the memory 14 and outputs a control signal to unlock the container 2a or 2b and a control signal to lock the other container 2b or 2a. This configuration is able to prevent each user from mistakenly taking out a parcel from the space in the vehicle previously ensured by the other user.

(3) The vehicle management server 10 also includes the information acquisition unit 131 that acquires use start information indicating that the user A or B has started to use the vehicle 1 (FIG. 3). When the information acquisition unit 131 acquires the use start information, the output unit 135 outputs a control signal to unlock the container 2a or 2b corresponding to the user A or B who has started to use the vehicle 1. That is, locking and unlocking are managed or controlled in accordance with the actual use time of each user. Thus, for example, even if the return time is ahead of or behind schedule, each user is able to properly ensure a space.

(4) The information acquisition unit 131 acquires use end information indicating that the user A or B has ended the use of the vehicle 1. The vehicle management server 10 also includes the accommodation determination unit 134 that determines whether any item is present or accommodated in the container 2a or 2b corresponding to the user A or B who is using the vehicle 1 (FIG. 3). If the information acquisition unit 131 acquires the use end information and the accommodation determination unit 134 determines that an item is present in the container 2a or 2b corresponding to the user A or B who is using the vehicle 1, the output unit 135 outputs a notification signal indicating that the item is present in the container 2a or 2b. Thus, the forgotten item can be addressed.

(5) The use schedule of the vehicle 1 includes information indicating the type of the vehicle 1, information indicating the scheduled use start date/time and scheduled return date/time of the vehicle 1, and information indicating the destination location and scheduled destination arrival date/time when using the vehicle 1 (FIG. 1). Thus, for example, it is possible to make, to a user who will use the vehicle 1, a suggestion that the vehicle 1 (a container 2) be used as the location to which a parcel to be delivered on the same day as the scheduled use date is delivered. It is also possible to make, to a user who will use the vehicle 1, a suggestion that the user undertake delivery or collection of a parcel near the destination when using the vehicle 1 or the scheduled route leading to the destination.

The above-mentioned embodiment can be modified into various forms. Hereafter, modifications will be described. While, in the above embodiment, the use schedule made by the scheduling unit 132 is reported to the delivery service provider, a use schedule of the shared vehicle made need not be reported to a delivery service provider. For example, the use schedule may be reported to businesses that want to distribute items, such as samples or presents, for promoting goods or services toward unspecified users, in place of a delivery service provider, which delivers parcels to specified users, or in addition to a delivery service provider.

While, in the above embodiment, the delivery service provider determines the correspondence between the containers 2a and 2b accommodating parcels and the users A and B, a correspondence between a plurality of containers and a plurality of users respectively using the plurality of containers need not be determined by a delivery service provider. For example, the delivery terminal 40 may previously transmit delivery information indicating the delivery destinations, the desired parcel delivery dates, and the like to the vehicle management server 10, and the vehicle management server 10 may determine the correspondence between the containers and the users of the containers and transmit the correspondence to the delivery service provider. Or, each user may reserve the container 2a or 2b and then specify the reserved container 2a or 2b as the parcel delivery location or the like.

While, in the above embodiment, the information acquisition unit 131 acquires the authentication card reading result and determines whether the user A or B has ended the use of the vehicle 1 and whether there is something forgotten, on the basis of the reading result, information indicating whether the use of the shared vehicle has ended acquired by an information acquisition unit may be otherwise. For example, the information acquisition unit may acquire, from sensors mounted on the vehicle 1, information indicating whether the position of the vehicle 1 is the return location, whether the switches have been turned off, whether the doors have been locked, or the like and determine whether the use of the shared vehicle has ended, on the basis of such information.

The above embodiment can be combined as desired with one or more of the above modifications. The modifications can also be combined with one another.

According to the present invention, it becomes possible for users of a shared vehicle to ensure a space under their own control in the vehicle beforehand.

Above, while the present invention has been described with reference to the preferred embodiments thereof, it will be understood, by those skilled in the art, that various changes and modifications may be made thereto without departing from the scope of the appended claims.

What is claimed is:

1. A vehicle management server for managing a shared vehicle used by a plurality of users in different time slots, the vehicle management server comprising:
 a processor and a memory connected to the processor, wherein
 the processor is configured to perform:
  receiving use reservations for using the shared vehicle from the plurality of users; and
  making a use schedule of the shared vehicle, wherein
 the memory is configured to store a correspondence between a plurality of containers provided in the shared vehicle and the plurality of users respectively using the plurality of containers, wherein
 the processor is further configured to perform:
  outputting a control signal to command the shared vehicle to lock or unlock each of the plurality of containers provided in the shared vehicle based on the use schedule made in the making and the correspondence stored in the memory.

2. The vehicle management server according to claim 1, wherein
 the processor is configured to perform:
  the outputting including:
   identifying a container corresponding to a user using the shared vehicle from among the plurality of containers based on the correspondence stored in the memory;
   outputting a control signal to command the shared vehicle to unlock the container identified in the identifying; and
   outputting a control signal to command the shared vehicle to lock other containers than the container identified in the identifying.

3. The vehicle management server according to claim 2, wherein
 the processor is further configured to perform:

acquiring a use start information indicating start of use of the shared vehicle by each of the plurality of users, wherein the processor is configured to perform:

the outputting including outputting a control signal to command the shared vehicle to unlock a container corresponding to a user starting use of the shared vehicle when the use start information is acquired.

4. The vehicle management server according to claim 3, wherein the processor is further configured to perform:

determining whether any item is accommodated in the container corresponding to the user using the shared vehicle, wherein the processor is configured to perform:

the acquiring including acquiring a use end information indicating end of use of the shared vehicle by each of the plurality of users, and the outputting including outputting a notification signal notifying that an item is accommodated in the container when the use end information is acquired in the acquiring and it is determined in the determining that the item is accommodated in the container corresponding to the user using the shared vehicle.

5. The vehicle management server according to claim 1, wherein the use schedule for the shared vehicle includes:

information regarding a type of the shared vehicle;

information regarding a scheduled use start date and time and a scheduled use end date and time of the shared vehicle;

information regarding a location of a destination of the shared vehicle; and information regarding a scheduled arrival date and time to the destination.

6. A vehicle management system, comprising:

the vehicle management server according to claim 1; and a vehicle used by a plurality of users in different time slots in a predetermined time period, wherein the vehicle includes:

a plurality of containers respectively configured to accommodate an item;

an actuator configured to lock and unlock each of the plurality of containers; and a controller configured to control operation of the actuator, wherein the controller is configured to control operation of the actuator in accordance with a control signal output from the vehicle management server.

7. A vehicle management method for managing a shared vehicle used by a plurality of users in different time slots, the vehicle management method comprising:

receiving use reservations for using the shared vehicle from the plurality of users;

making a use schedule of the shared vehicle, and outputting a control signal to command the shared vehicle to lock or unlock each of the plurality of containers provided in the shared vehicle based on the use schedule made in the making and a correspondence between a plurality of containers provided in the shared vehicle and the plurality of users respectively using the plurality of containers stored in a memory.

* * * * *